United States Patent
Nakajima et al.

(10) Patent No.: US 9,421,876 B2
(45) Date of Patent: Aug. 23, 2016

(54) ELECTRIC VEHICLE CHARGING APPARATUS

(71) Applicant: HONDA MOTOR CO., LTD., Tokyo (JP)

(72) Inventors: Masatoshi Nakajima, Wako (JP); Satoru Fujita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/362,858

(22) PCT Filed: Dec. 6, 2012

(86) PCT No.: PCT/JP2012/081697
§ 371 (c)(1),
(2) Date: Jun. 4, 2014

(87) PCT Pub. No.: WO2013/085007
PCT Pub. Date: Jun. 13, 2013

(65) Prior Publication Data
US 2014/0306659 A1    Oct. 16, 2014

(30) Foreign Application Priority Data

Dec. 9, 2011  (JP) .................................. 2011-270005
May 28, 2012  (JP) .................................. 2012-120641

(51) Int. Cl.
*H02J 7/00*    (2006.01)
*B60L 11/18*   (2006.01)
(Continued)

(52) U.S. Cl.
CPC .......... *B60L 11/1818* (2013.01); *B60L 3/0069* (2013.01); *B60L 11/1803* (2013.01);
(Continued)

(58) Field of Classification Search
CPC ............ B60L 11/1818; B60L 11/1803; B60L 11/1805; B60L 11/1816; B60L 11/1824; B60L 11/1826; B60L 2210/10; B60L 2240/547; B60L 2240/80; B60L 3/0069; H01M 2220/20; H01M 10/42; H01M 2200/00; Y02T 90/121; Y02T 90/128; Y02T 90/14; Y02T 10/7005; Y02T 10/7072; Y02T 90/127; Y02T 90/163; Y02T 90/169; Y04S 30/14
USPC ................... 320/109; 180/65.1, 65.29, 65.27
See application file for complete search history.

(56) References Cited

U.S. PATENT DOCUMENTS 8,768,533 B2 *  7/2014  Ichikawa ............. H04L 25/028
                                               180/65.29
2005/0140334 A1 *  6/2005  Tamai et al. .................. 320/116
(Continued)

FOREIGN PATENT DOCUMENTS

CN    101291005 A    10/2008
CN    102195333 A    9/2011
(Continued)

OTHER PUBLICATIONS

International Search Report, dated Mar. 12, 2013, issued in corresponding application No. PCT/JP2012/081697.
(Continued)

*Primary Examiner* — Nathaniel Pelton
(74) *Attorney, Agent, or Firm* — Westerman, Hattori, Daniels & Adrian, LLP (57) ABSTRACT

An electric vehicle charging apparatus includes: a vehicle-side charging connector that is attachably and detachably connected to a charger-side connector provided in an outside vehicle charger; vehicle-side charging positive pole and negative pole lines that connect the vehicle-side charging connector and a power storage apparatus that is capable of being charged with the charger; a diode that is provided in the vehicle-side charging line, in which a forward direction is toward the power storage apparatus from the charger; and a resistor that is disposed in the vehicle to connect the vehicle-side charging positive pole line and the vehicle-side charging negative pole line between the diode and the vehicle-side charging connector.

12 Claims, 7 Drawing Sheets

(51) Int. Cl.
  *B60L 3/00* (2006.01)
  *H01M 10/42* (2006.01)

(52) U.S. Cl.
  CPC ........ *B60L11/1805* (2013.01); *B60L 11/1816* (2013.01); *B60L 11/1824* (2013.01); *B60L 11/1846* (2013.01); *H01M 10/42* (2013.01); *B60L 2210/10* (2013.01); *B60L 2240/547* (2013.01); *B60L 2240/80* (2013.01); *H01M 2200/00* (2013.01); *H01M 2220/20* (2013.01); *Y02T 10/7005* (2013.01); *Y02T 10/7072* (2013.01); *Y02T 10/7216* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(56) References Cited

U.S. PATENT DOCUMENTS

| 2006/0071557 | A1* | 4/2006 | Osawa ................. B60L 3/0046 307/10.1 |
| 2011/0121780 | A1* | 5/2011 | Fukuo et al. ................. 320/109 |
| 2011/0199048 | A1* | 8/2011 | Yokoyama et al. .......... 320/109 |
| 2011/0216449 | A1* | 9/2011 | Reschovsky et al. .......... 361/18 |
| 2011/0273139 | A1* | 11/2011 | Hofheinz ....................... 320/109 |
| 2011/0279082 | A1* | 11/2011 | Hagenmaier, Jr. .. B60L 11/1824 320/109 |
| 2011/0291612 | A1* | 12/2011 | Fujitake ......................... 320/107 |
| 2012/0029728 | A1* | 2/2012 | Hirayama et al. ................ 701/1 |
| 2012/0091958 | A1* | 4/2012 | Ichikawa et al. .............. 320/109 |
| 2012/0098487 | A1* | 4/2012 | Hooker ................. B60L 3/0046 320/109 |
| 2012/0098490 | A1* | 4/2012 | Masuda ......................... 320/109 |
| 2013/0049685 | A1* | 2/2013 | Farah et al. ................... 320/109 |
| 2013/0181675 | A1* | 7/2013 | Kawasaki et al. ............. 320/109 |
| 2014/0132226 | A1* | 5/2014 | Sakamoto .............. H02H 9/001 320/166 |

FOREIGN PATENT DOCUMENTS

| JP | 2003-047163 A | | 2/2003 |
| JP | 2009-106053 A | | 5/2009 |
| JP | 2010-041794 A | | 2/2010 |
| JP | 2010-088215 A | | 4/2010 |
| JP | 2010-098912 A | | 4/2010 |
| JP | 2011-024317 A | | 2/2011 |
| JP | WO2011125214 | * | 10/2011 |
| JP | 2013-038996 A | | 2/2013 |
| WO | 2010/125625 A1 | | 11/2010 |
| WO | 2012/029479 A1 | | 3/2012 |

OTHER PUBLICATIONS

Chinese Office Action dated Dec. 8, 2014, issued in corresponding CN Application No. 201280056600.9, with English translation. (12 pages).

* cited by examiner

ELECTRIC VEHICLE CHARGING APPARATUS

TECHNICAL FIELD

The present invention relates to an electric vehicle charging apparatus.

Priority is claimed on Japanese Patent Application No. 2011-270005, filed Dec. 9, 2011, and Japanese Patent Application No. 2012-120641, filed May 28, 2012, the contents of which are incorporated herein by reference.

BACKGROUND

In the related art, for example, a vehicle drive apparatus is known in which a conduction shut-off relay (contactor) is provided between a charging port connected to an external charger and a battery to prevent live destination exposure of a charging port, and which detects a short circuit of the charging port based on a voltage of a smoothing capacitor of an inverter circuit connected to the charging port (for example, refer to Patent Document 1).

RELATED ART DOCUMENTS

Patent Documents

[Patent Document 1] Japanese Unexamined Patent Application, First Publication No. 2010-41794

SUMMARY OF INVENTION

Problems to be Solved by the Invention

The conduction shut-off relay included in the vehicle drive apparatus of the related art has a structure in which a high voltage contact is typically retained by electromagnetic force. For example, when a large current equal to or greater than a predetermined current value flows through a high voltage contact portion due to a short circuit between the charging port and the external charger, or the like, electromagnetic repulsion may occur.

For example, in relation to this problem occurring, when anti-short circuit current performance of the relay is improved to suppress the occurrence of the electromagnetic repulsion, costs increase. Accordingly, there is a case where a reverse flow prevention diode is installed between the charging port and the battery to prevent a large current equal to or greater than a predetermined value from flowing through the high voltage contact portion.

However, in the reverse flow prevention diode, a current flows not only reversely in an abnormal state (that is, in a breakdown state) caused by the occurrence of a short circuit but also a very small current flows reversely in a normal state. For this reason, with regard to the reverse flow prevention diode, it is desirable to appropriately determine a normal state and an abnormal state caused by occurrence of a short circuit.

For example, when a short circuit is detected based on a voltage that is detected by a voltage sensor provided on an external charger side, in light of a very small current flowing reversely through a diode in a normal state, it is necessary to set a determination threshold value for determining a normal state and an abnormal state of the diode from a detected result of the voltage output from the voltage sensor.

However, when impedance of the external charger-side voltage sensor is unknown, it is not possible to specify a normal voltage of a diode, and it is difficult to appropriately set the determination threshold value.

For example, an apparatus is known which detects a voltage change (for example, a discharging velocity) of a charging connector after a high voltage is applied from the external charger side to a vehicle side in a state where the vehicle-side contactor is shut off, and determines whether a circuit is insulated based on the detected result.

However, in the apparatus, when a resistor is connected between a positive pole and a negative pole on a charging connector side instead of on a vehicle-side contactor side, there is a case where the resistor functions as so-called discharging resistance, a discharging velocity increases to exceed a predetermined normal range, and occurrence of insulation failure is falsely detected.

In view of foregoing, an object of an aspect of the present invention is to provide an electric vehicle charging apparatus which can appropriately determine whether or not an abnormal state exists.

Means for Solving the Problem

An electric vehicle charging apparatus according to an aspect of the present invention adopts the following configuration to achieve the object.

(1) An electric vehicle charging apparatus according to one aspect of the present invention is an electric vehicle charging apparatus equipped with a power storage apparatus that is capable of being charged with an outside vehicle charger, the apparatus including: a vehicle-side charging connector that is attachably and detachably connected to a charger-side connector provided in the charger; vehicle-side charging positive pole and negative pole lines that connect the vehicle-side charging connector and the power storage apparatus; a diode that is provided in the vehicle-side charging line, in which a forward direction is toward the power storage apparatus from the charger; and a resistor that is disposed in the vehicle to connect the vehicle-side charging positive pole line and the vehicle-side charging negative pole line between the diode and the vehicle-side charging connector.

(2) In the aspect (1), the electric vehicle charging apparatus may further include a contactor that is provided between the vehicle-side charging connector and the resistor, and that is connected while charging is performed.

(3) In the aspect (1), the electric vehicle charging apparatus may further include a contactor that is capable of shutting off conduction between the power storage apparatus and the resistor.

(4) In any one of the aspects (1) to (3), the resistor may have the same resistance value as a resistance value that corresponds to a reverse current occurring due to a reverse bias of the diode in a non-breakdown state.

(5) In the aspect (4), the electric vehicle charging apparatus may include a stored power voltage detection unit that detects the voltage of the power storage apparatus; a voltage acquisition unit that acquires the voltage between the charger-side positive pole connector and the charger-side negative pole connector; and an abnormality determination unit which determines that the diode is in a breakdown state when charging of the power storage apparatus is not being performed by the charger, the contactor is connected, and the voltage between the charger-side positive pole and negative pole connectors acquired by the voltage acquisition unit is greater than ½ of the voltage of the power storage apparatus detected by the stored power voltage detection unit.

(6) In the aspect (5), in a state where charging of the power storage apparatus is not being performed by the charger, the contactor is open, and the voltage between the charger-side positive pole and negative pole connectors acquired by the voltage acquisition unit is less than ½ of the voltage of the power storage apparatus detected by the stored power voltage detection unit, when the contactor is set to be in a connection state, and then the voltage between the charger-side positive pole and negative pole connectors acquired by the voltage acquisition unit is greater than ½ of the voltage of the power storage apparatus detected by the stored power voltage detection unit, the abnormality determination unit may determine that the diode is in a breakdown state, and the electric vehicle charging apparatus may further include a second abnormality determination unit that stores the voltage between the charger-side positive pole and negative pole connectors as a stored voltage when charging of the power storage apparatus is not being performed by the charger, the contactor is open, and the voltage between the charger-side positive pole and negative pole connectors acquired by the voltage acquisition unit is equal to or greater than ½ of the voltage of the power storage apparatus detected by the stored power voltage detection unit, and that determines that the diode is in a breakdown state when the contactor is set to be in a connection state, and then the voltage between the charger-side positive pole and negative pole connectors acquired by the voltage acquisition unit is greater than the stored voltage.

Advantage of the Invention

According to the aspect (1), for example, when it is determined whether or not the diode is in an abnormal state such as a breakdown state based on comparison between the voltage detected on the vehicle side (for example, a voltage between positive and negative poles of the power storage apparatus) and the voltage detected on an outside vehicle charger side (for example, the voltage between the charger-side positive pole and negative pole connectors) and the like, even though the charger-side resistance value is unknown, it is possible to appropriately determine whether or not an abnormal state exists compared to when the resistor is not included.

That is, in a case where the resistor is not included, when the diode is in a breakdown state (that is, when a resistance value for a reverse current occurring due to a reverse bias is zero or smaller than that of a normal state), the voltage detected on the outside vehicle charger side becomes a value equal to or close to the voltage detected on the vehicle side. In contrast, even in a case where the diode is in a normal state, when the charger-side resistance value is remarkably great compared to an equivalent resistance value of the diode, the voltage detected on the vehicle side and the voltage detected on the outside vehicle charger side become substantially the same, and it is difficult to determine whether or not the diode is in an abnormal state.

In contrast, since the resistor is included, a resistance value between the outside vehicle charger-side positive and negative poles is obtained by combining each resistance value of the resistor and the charger which are in parallel with each other. When the diode is in a normal state, even though the resistance value of the charger is unknown, based on the resistance value of the resistor, the voltage detected on the charger side becomes a much smaller value compared to the case where the resistor is not included.

In contrast, even though the resistor is included, when the diode is in a breakdown state, the voltage detected on the outside vehicle charger side becomes a value equal to or close to the voltage detected on the vehicle side. Accordingly, it is possible to easily determine whether or not an abnormal state exists.

According to the aspect (2), since a simple configuration is provided in which only the resistor is installed between the vehicle-side charging positive pole line and the vehicle-side charging negative pole line, it is possible to appropriately determine whether or not the diode is in an abnormal state while suppressing an increase in cost necessary for the configuration.

In this case, for example, it is possible to determine whether or not the diode is in an abnormal state based on comparison between a voltage detected on the vehicle side (a voltage between both poles of the power storage apparatus or the like) and a voltage detected on the charger side (a voltage between both poles of the charger-side connectors or the like) and the like.

For example, in a closed loop circuit that starts from the positive pole of the power storage apparatus mounted on the electric vehicle and ends at the negative pole of the power storage apparatus via the diode and the charging contactor (contactor) in the vehicle-side charging positive pole line, each of the vehicle-side and the charger-side positive pole connectors, a charger-side voltage sensor, each of the vehicle-side and the charger-side negative pole connectors, and the charging contactor (contactor) in the vehicle-side charging negative pole line, a section between the diode and the charging contactor in the vehicle-side charging positive pole line is connected to the vehicle-side charging negative pole line via the resistor.

Since the resistor is included, the resistance value between the outside vehicle charger-side positive and negative poles is obtained by combining each resistance value of the resistor and the charger which are in parallel with each other. Accordingly, when the diode is in a normal state, even though the resistance value of the charger is unknown, based on the resistance value of the resistor, the voltage detected on the charger side becomes a much smaller value compared to the case where the resistor is not included.

In contrast, even though the resistor is included, when the diode is in a breakdown state, the voltage detected on the outside vehicle charger side becomes a value equal to or close to the voltage detected on the vehicle side.

It is possible to easily determine whether or not an abnormal state of the diode exists based on a change in the voltage.

For example, in a case where the resistor is not included, when the diode is in a breakdown state (that is, when the resistance value for a reverse current occurring due to a reverse bias is zero or smaller than that of a normal state), the voltage detected on the outside vehicle charger side becomes a value equal to or close to the voltage detected on the vehicle side.

In addition, even in a case where the diode is in a normal state, when the charger-side resistance value is remarkably great compared to the equivalent resistance value of the diode, the voltage detected on the vehicle side and the voltage detected on the outside vehicle charger side become substantially the same.

Accordingly, when the resistor is not included, it is difficult to determine whether or not the diode is in an abnormal state.

Therefore, according to the aspect (2), even though the charger-side resistance value including an internal impedance of the voltage sensor is unknown, it is not necessary, for example, to provide a voltage sensor having a known internal impedance between both poles of the charger or the like, and it is possible to appropriately determine whether or not an abnormal state exists.

Furthermore, when it is determined that the diode is in an abnormal state such as a breakdown state, each of the charging contactors is quickly opened. Accordingly, even though a short circuit occurs between each of the charging contactors and the charger, it is possible to prevent electromagnetic repulsion from occurring at each of the charging contactors and to safely detach the charger-side connectors and the vehicle-side connectors from each other.

Furthermore, even in a case where a high voltage is applied from the charger side to the vehicle side in a state where each of the charging contactors is in an open state, then a voltage change (for example, a discharging velocity) between both poles of the charger-side connectors is detected, and then based on the detected result, it is determined whether or not the closed loop circuit is insulated, it is possible to prevent the discharging velocity from increasing to exceed a predetermined normal range using the resistor, and it is possible to prevent a false detection of the occurrence of an insulation failure.

According to the aspect (4), it is possible to simplify the process of determining whether or not the diode is in an abnormal state.

According to the aspect (5), even though the charger-side resistance value is unknown, when the charger-side resistance value is remarkably great compared to the equivalent resistance value of the diode in a normal state, it is possible to regard a voltage between the charger-side positive pole and negative pole connectors acquired by the voltage acquisition unit as being equal to or less than at least ½ of the voltage of the power storage apparatus.

Accordingly, when the voltage between the charger-side positive pole and negative pole connectors is greater than ½ of the voltage of the power storage apparatus, it is possible to appropriately determine that the diode is in a breakdown state.

According to the aspect (6), when a voltage between the charger-side positive pole and negative pole connectors acquired by the voltage acquisition unit greatly changes as each of the contactors (charging contactors) is switched from an open state to a connection state, it is possible to appropriately determine that the diode is in a breakdown state.

DESCRIPTION OF THE EMBODIMENTS

Hereinafter, an electric vehicle charging apparatus according to one embodiment of the present invention will be described with reference to the accompanying drawings.

Figure 1:
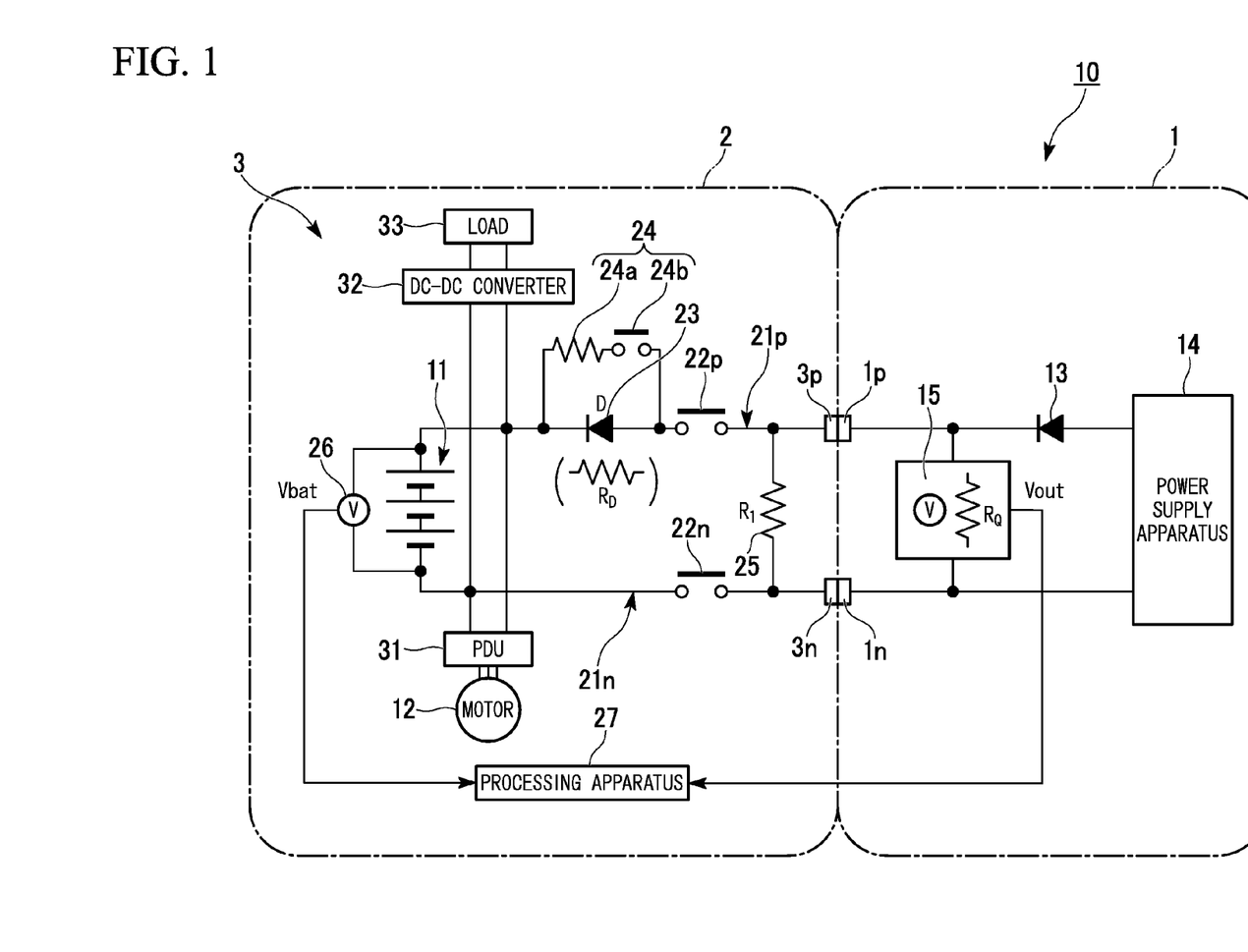
FIG. 1 is a configuration diagram of an electric vehicle charging apparatus according to an embodiment of the present invention.

For example, as illustrated in FIG. 1, an electric vehicle charging apparatus 10 according to the embodiment includes a vehicle-side charging apparatus 3 mounted on an electric vehicle 2 that includes a battery 11 which can be charged with an outside vehicle charger 1, and a motor 12 which outputs a drive force for driving a vehicle by using electrical power of the battery 11.

For example, the charger 1 includes a charger-side positive pole connector 1p and a charger-side negative pole connector 1n which are attachably and detachably connected, respectively, to a vehicle-side charging positive pole connector 3p and a vehicle-side charging negative pole connector 3n which are provided in the vehicle-side charging apparatus 3. A predetermined voltage is applied between the charger-side positive pole connector 1p and the charger-side negative pole connector 1n via a diode 13 by a power supply apparatus 14.

The charger 1 includes a charger-side voltage sensor 15 that detects an output voltage (a charger-side voltage) Vout between the charger-side positive pole connector 1p and the charger-side negative pole connector 1n, and outputs a signal of the detected result.

For example, the vehicle-side charging apparatus 3 includes the vehicle-side charging positive pole connector 3p and the vehicle-side charging negative pole connector 3n which are attachably and detachably connected, respectively, to the charger-side positive pole connector 1p and the charger-side negative pole connector 1n which are provided in the outside vehicle charger 1.

A positive pole-side contactor 22p and a negative pole-side contactor 22n are respectively provided in a vehicle-side charging positive pole line 21p and a vehicle-side charging negative pole line 21n which connect the vehicle-side charging connectors 3p and 3n and the battery 11. The positive pole-side contactor 22p and the negative pole-side contactor 22n are connected in series to each other in such a manner that conduction of a circuit can be electrically connected and disconnected by the opening and connection (connection by closing) thereof.

A diode (D) 23 is connected between the positive pole-side contactor 22p and the battery 11 in the vehicle-side charging positive pole line 21p, in which a forward direction is toward the battery 11 from the positive pole-side contactor 22p.

Furthermore, a pre-charge unit 24 is connected in parallel with the diode (D) 23 between the positive pole-side contactor 22p and the battery 11 in the vehicle-side charging positive pole line 21p, and is configured to have a pre-charge contactor 24a and pre-charge resistance 24b connected in series to each other.

A resistor 25 is provided to be connected to the vehicle-side charging positive pole line 21p between the vehicle-side charging positive pole connector 3p and the positive pole-side contactor 22p, and to the vehicle-side charging negative pole line 21n between the vehicle-side charging negative pole connector 3n and the negative pole-side contactor 22n.

For example, the resistor 25 has the same resistance value $R_1$ as the resistance value $R_D$ (for example, 40 kΩ) that corresponds to a reverse current occurring due to a reverse bias of the diode (D) 23 in a non-breakdown state (that is, in a normal state).

The vehicle-side charging apparatus 3 includes a vehicle-side voltage sensor 26 that detects a battery voltage (a vehicle-side voltage) Vbat which is a voltage between terminals of the battery 11, and outputs a signal of the detected result.

The vehicle-side charging apparatus 3 includes a processing apparatus 27 that determines whether or not the diode (D) 23 is in an abnormal state such as a breakdown state based on a signal output from the charger-side voltage sensor 15 and a signal output from the vehicle-side voltage sensor 26.

For example, when charging is not performed from the charger 1 to the battery 11, the positive pole-side contactor 22p and the negative pole-side contactor 22n are connected (connected by closing), and the charger-side voltage Vout detected by the charger-side voltage sensor 15 is greater than ½ of the battery voltage Vbat detected by the vehicle-side voltage sensor 26, the processing apparatus 27 determines that the diode (D) 23 is in a breakdown state.

Hereinafter, Example and Comparative Example of the electric vehicle charging apparatus 10 according to the above-described embodiment will be described.

In Example, the electric vehicle charging apparatus 10 according to the embodiment includes the resistor 25 that connects the vehicle-side charging positive pole line 21p and the vehicle-side charging negative pole line 21n. In Comparative Example, the resistor 25 is omitted.

In Example and Comparative Example, a predetermined voltage is not applied between the charger-side connectors 1p and 1n of the charger 1 by the power supply apparatus 14, the charger-side connectors 1p and 1n are respectively connected to the vehicle-side charging connectors 3p and 3n, and the positive pole-side contactor 22p and the negative pole-side contactor 22n are set to be in a connection (a connection by closing) state.

In this state, when a current does not flow reversely through the diode (D) 23, the charger-side voltage Vout detected by the charger-side voltage sensor 15 becomes zero.

However, in practicality, since a current flows reversely through the diode (D) 23, the charger-side voltage Vout detected by the charger-side voltage sensor 15 becomes a value equal to or greater than zero.

In Comparative Example, when a charger 1-side resistance value $R_Q$ is unknown, it is not possible to specify a value of the charger-side voltage Vout.

When the diode (D) 23 is in a breakdown state (that is, when the equivalent resistance value $R_D$ for a reverse current occurring due to a reverse bias is zero or smaller than that of a normal state), the charger-side voltage Vout detected on the outside vehicle charger 1 side becomes a value equal to or close to the battery voltage Vbat detected on the vehicle side.

In contrast, even in a case where the diode (D) 23 is in a normal state, when the charger 1-side resistance value $R_Q$ is remarkably great compared to the equivalent resistance value $R_D$ of the diode (D) 23, the battery voltage Vbat and the charger-side voltage Vout become substantially the same, and it is difficult to determine whether or not the diode (D) 23 is in an abnormal state.

In contrast, in Example, since the resistor 25 is included, as shown, for example, in the following equation (1), a resistance value R between the charger-side connectors 1p and 1n on the outside vehicle charger 1 side becomes a value obtained by combining the resistance values $R_1$ and $R_Q$ which are the resistance values of the resistor 25 and the charger 1, respectively, which are in parallel with each other.

Accordingly, when the diode (D) 23 is in a normal state, even though the charger 1-side resistance value $R_Q$ is unknown, based on the resistance value $R_1$ of the resistor 25, the charger-side voltage Vout detected on the charger 1 side becomes a much smaller value compared to Comparative Example in which the resistor 25 is not included.

Moreover, even though the resistor 25 is included, when the diode (D) 23 is in a breakdown state, the charger-side voltage Vout detected on the charger 1 side becomes a value equal to or close to the battery voltage Vbat detected on the vehicle side. Accordingly, it is possible to easily determine whether or not the diode (D) 23 is in an abnormal state.

[Equation 1]

$$R = \frac{R_Q \cdot R_1}{R_Q + R_1} \tag{1}$$

More specifically, in Example, when the diode (D) 23 is in a normal state, the charger-side voltage Vout detected on the charger 1 side becomes an upper limit voltage VoutH that is described in the following equation (2).

For example, in the following equation (2), when the resistance value $R_1$ of the resistor 25 is the same as the equivalent resistance value $R_D$ of the diode (D) 23, and the charger 1-side resistance value $R_Q$ is remarkably great compared to each of the resistance values $R_D$ and $R_1$, the upper limit voltage VoutH becomes approximately equal to ½ of the battery voltage Vbat.

[Equation 2]

$$VoutH = Vbat \cdot \frac{R}{R_D + R} \quad (2)$$

Accordingly, when the charger-side voltage Vout is greater than ½ of the battery voltage Vbat, it is possible to appropriately determine that the diode (D) 23 is in an abnormal state such as a breakdown state.

Figure 2A:
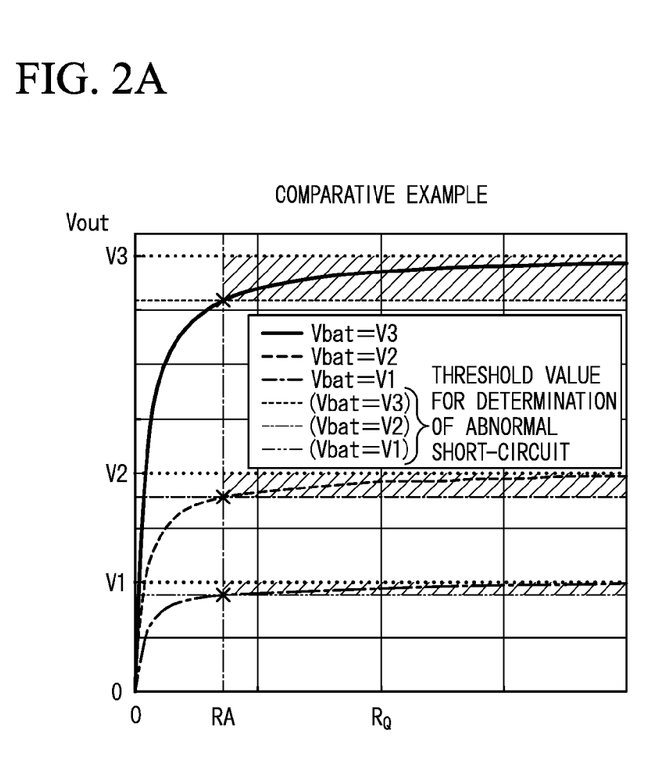
FIG. 2A illustrates an example of a relationship between a charger-side voltage and a charger-side resistance value $R_Q$ of the electric vehicle charging apparatus according to Comparative Example of the embodiment of the present invention.
Figure 2B:
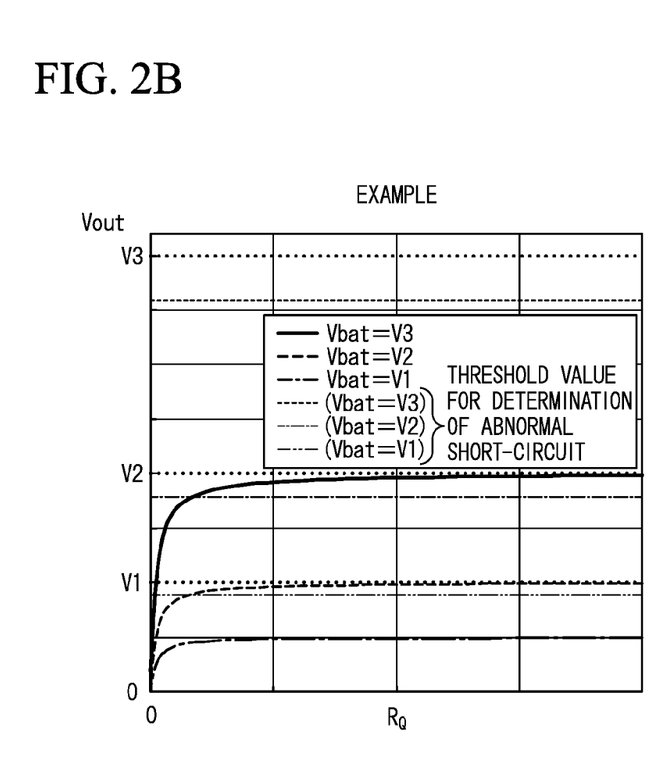
FIG. 2B illustrates an example of a relationship between the charger-side voltage and the charger-side resistance value $R_Q$ of the electric vehicle charging apparatus according to Example of the embodiment of the present invention.

For example, in Comparative Example and Example, each of FIGS. 2A and 2B illustrates the battery voltage Vbat and a predetermined threshold value for determination of an abnormal short-circuit which, in light of a detection error of the vehicle-side voltage sensor 26, is set for the charger-side voltage Vout to determine whether or not the diode (D) 23 is in a breakdown state.

In this case, in Comparative Example, when the diode (D) 23 has inherent characteristic that a reverse current becomes the maximum when the charger 1-side resistance value $R_Q$ is equal to or greater than a predetermined value RA, it is not possible to determine whether the diode (D) 23 is normal or abnormal due to a detection error of the charger-side voltage sensor 15.

In contrast, in Example, the vehicle-side charging apparatus 3 includes the resistor 25 having the same resistance value $R_1$ as the equivalent resistance value $R_D$ of the diode (D) 23. Accordingly, when the diode (D) 23 is normal, regardless of the charger 1-side resistance value $R_Q$, the charger-side voltage Vout becomes equal to or less than ½ of the battery voltage Vbat, and it can be accurately determined whether the diode (D) 23 is normal or abnormal.

For example, when charging is not performed from the charger 1 to the battery 11, the positive pole-side contactor 22p and the negative pole-side contactor 22n are open, and the charger-side voltage Vout is less than ½ of the battery voltage Vbat, the processing apparatus 27 sets the positive pole-side contactor 22p and the negative pole-side contactor 22n to be in a connection (connection by closing) state.

When the charger-side voltage Vout detected by the charger-side voltage sensor 15 is greater than ½ of the battery voltage Vbat, it is determined that the diode (D) 23 is in a breakdown state.

Furthermore, for example, when charging is not performed from the charger 1 to the battery 11, the positive pole-side contactor 22p and the negative pole-side contactor 22n are open, and the charger-side voltage Vout is equal to or greater than ½ of the battery voltage Vbat, the processing apparatus 27 stores the charger-side voltage Vout as a stored voltage.

When the positive pole-side contactor 22p and the negative pole-side contactor 22n are in a connection state, and then the charger-side voltage Vout (that is, a present value of the charger-side voltage Vout) detected by the charger-side voltage sensor 15 is greater than the stored voltage, it is determined that the diode (D) 23 is in a breakdown state.

The electric vehicle 2 includes a power drive unit (PDU) 31 that includes an inverter controlling conduction of the motor 12 based on a voltage of the battery 11 or the like, and a DC-DC converter 32 that steps down a voltage of the battery 11 and applies the step-down voltage to a load 33 such as an auxiliary machine.

The electric vehicle charging apparatus 10 according to the embodiment has the configuration described above. Subsequently, an operation of the electric vehicle charging apparatus 10 will be described.

Figure 3:
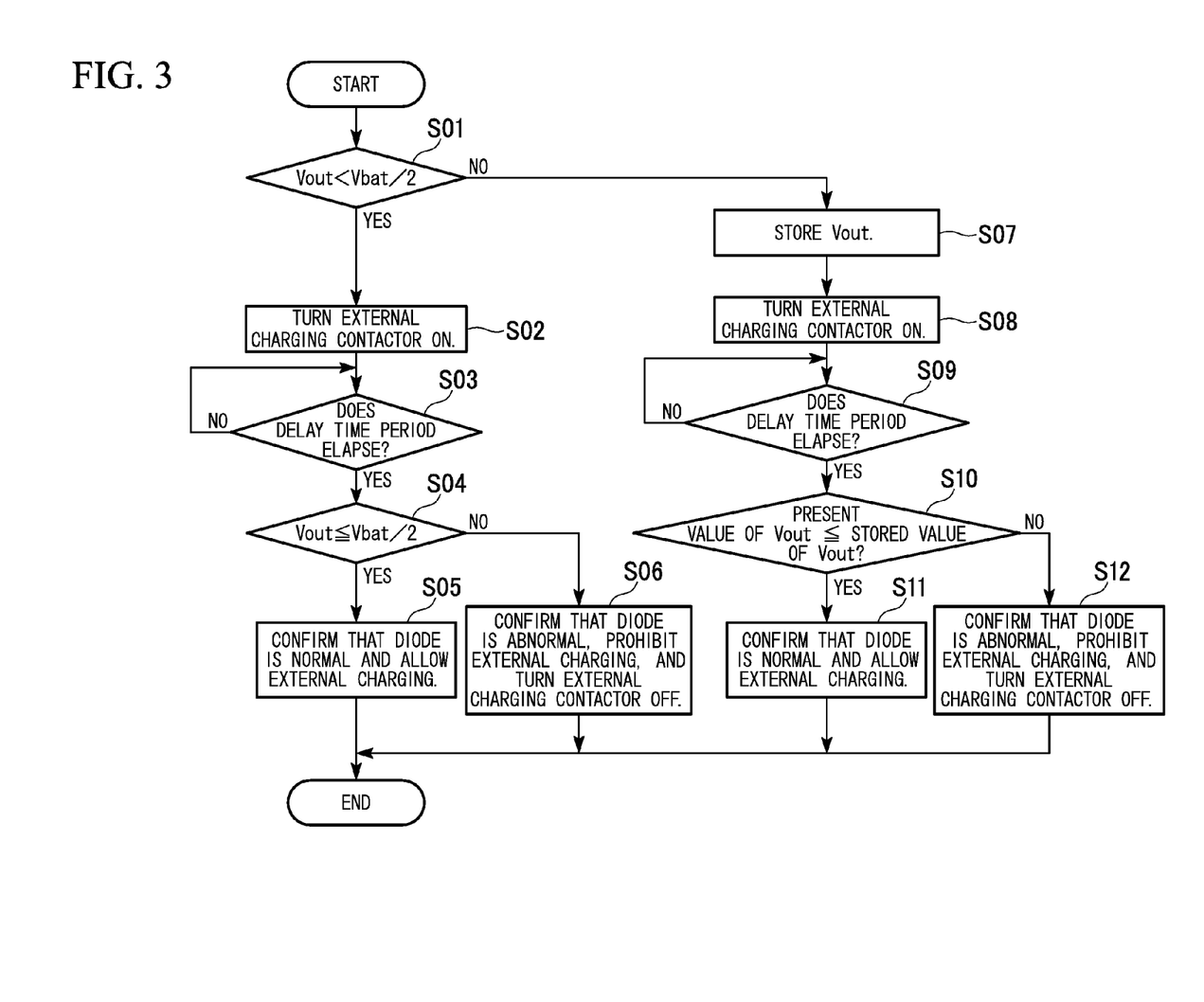
FIG. 3 is a flow chart illustrating an operation of the electric vehicle charging apparatus according to the embodiment of the present invention.

First, for example, in step S01 illustrated in FIG. 3, it is determined whether or not the charger-side voltage Vout is less than ½ of the battery voltage Vbat.

When the determination result is "YES", the process proceeds to step S02.

In contrast, when the determination result is "NO", the process proceeds to step S07 to be described later.

In step S02, each of external charging contactors, that is, each of the positive pole-side contactor 22p and the negative pole-side contactor 22n is switched from an open state to a connection (a connection by closing) state.

In step S03, it is determined whether or not a predetermined delay time period elapses after each of the positive pole-side contactor 22p and the negative pole-side contactor 22n is switched from the open state to the connection (connection by closing) state.

When the determination result is "YES", the process proceeds to step S04.

In contrast, when the determination result is "NO", determination process of step S03 is repeatedly performed.

In step S04, it is determined that whether or not the charger-side voltage Vout is equal to or less than ½ of the battery voltage Vbat.

When the determination result is "YES", the process proceeds to step S05. In step S05, it is confirmed that the diode (D) 23 is in a normal state, the battery 11 is allowed to be charged with the outside vehicle charger 1, and the process proceeds to END.

In contrast, when the determination result is "NO", the process proceeds to step S06. In step S06, it is confirmed that the diode (D) 23 is in an abnormal state (that is, in a breakdown state), the battery 11 is prohibited from being charged with the outside vehicle charger 1, each of the positive pole-side contactor 22p and the negative pole-side contactor 22n is switched from a connection (a connection by closing) state to an open state, and the process proceeds to END.

In step S07, the charger-side voltage Vout at this point of time is stored as a stored voltage (a stored value of the charger-side voltage Vout).

In step S08, each of the external charging contactors, that is, each of the positive pole-side contactor 22p and the negative pole-side contactor 22n is switched from an open state to a connection (a connection by closing) state.

In step S09, it is determined whether or not a predetermined delay time period elapses after each of the positive pole-side contactor 22p and the negative pole-side contactor 22n is switched from the open state to the connection (the connection by closing) state.

When the determination result is "YES", the process proceeds to step S10.

In contrast, when the determination result is "NO", determination process of step S09 is repeatedly performed.

In step S10, it is determined whether or not the charger-side voltage Vout (a present value of the charger-side voltage Vout) detected at this point of time by the charger-side voltage sensor 15 is equal to or less than the stored voltage (a stored value of the charger-side voltage Vout).

When the determination result is "YES", the process proceeds to step S11. In step S11, it is confirmed that the diode (D) 23 is in a normal state, the battery 11 is allowed to be charged with the outside vehicle charger 1, and the process proceeds to END.

In contrast, when the determination result is "NO", the process proceeds to step S12. In step S12, it is confirmed that the diode (D) 23 is in an abnormal state (that is, in a breakdown state), the battery 11 is prohibited from being charged with the outside vehicle charger 1, each of the positive pole-side contactor 22p and the negative pole-side contactor 22n is switched from a connection (a connection by closing) state to an open state, and the process proceeds to END.

Figure 4A:
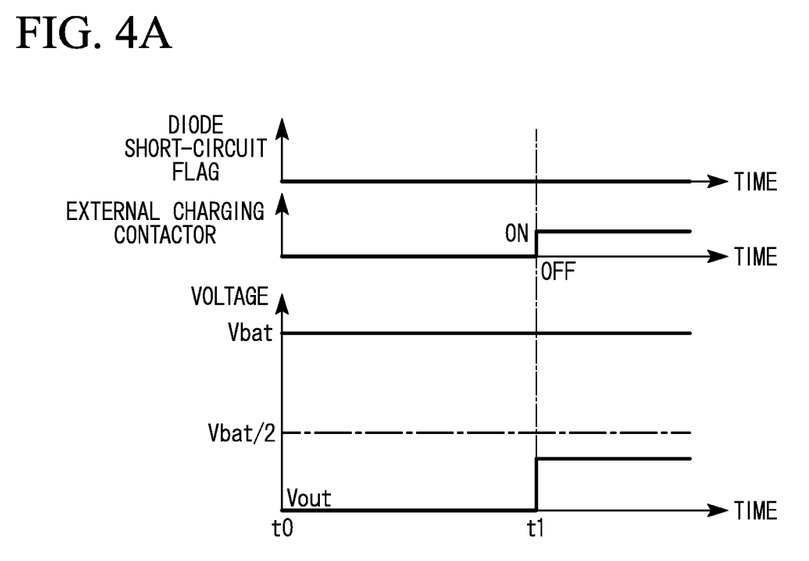
FIG. 4A illustrates graphs showing, in the electric vehicle charging apparatus according to the embodiment of the present invention, an example of a relationship among a vehicle-side voltage (a battery voltage Vbat), a charger-side voltage (an output voltage) Vout, an on/off state of an external charging contactor, and a diode short-circuit flag.

That is, in the state of step S05, for example, as illustrated in FIG. 4A, the charger-side voltage Vout is less than ½ of the battery voltage Vbat before time reaches from time T0 to time t1.

Even though the charger-side voltage Vout becomes great as each of the positive pole-side contactor 22p and the negative pole-side contactor 22n is switched from an open state to a connection (a connection by closing) state at the time t1, the charger-side voltage Vout becomes equal to or less than ½ of the battery voltage Vbat.

Figure 4B:
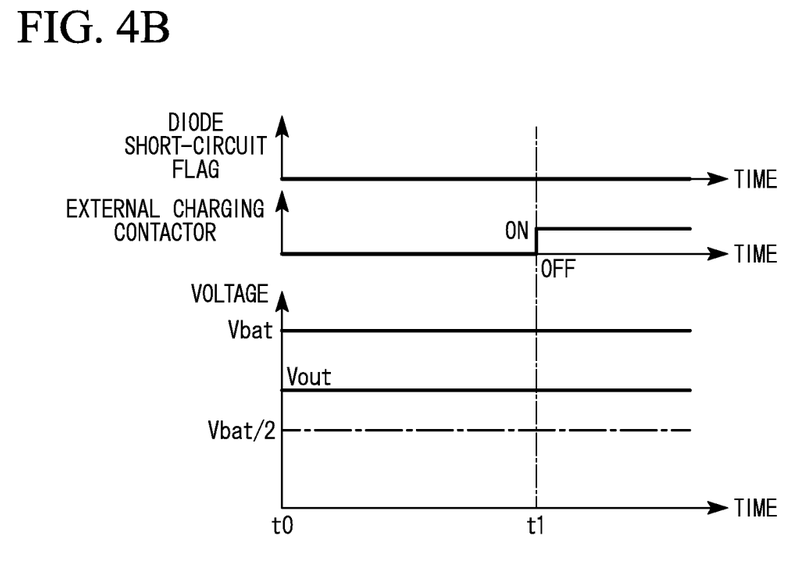
FIG. 4B illustrates graphs showing, in the electric vehicle charging apparatus according to the embodiment of the present invention, an example of a relationship among the vehicle-side voltage (the battery voltage Vbat), the charger-side voltage (the output voltage) Vout, an on/off state of the external charging contactor, and the diode short-circuit flag.

For example, in the state of step S06, for example, as illustrated in FIG. 4B, the charger-side voltage Vout is less than ½ of the battery voltage Vbat before time reaches from the time t0 to the time t1.

As each of the positive pole-side contactor 22p and the negative pole-side contactor 22n is switched from an open state to a connection (a connection by closing) state at the time t1, the charger-side voltage Vout increases to exceed ½ of the battery voltage Vbat.

In this case, at time t2, a flag value of a diode short-circuit flag is switched from "0" to "1", and it is confirmed that the diode (D) 23 is in an abnormal state (that is, in a breakdown state).

Furthermore, at time t3, the positive pole-side contactor 22p and the negative pole-side contactor 22n is switched from the connection (the connection by closing) state to the open state.

Figure 4C:
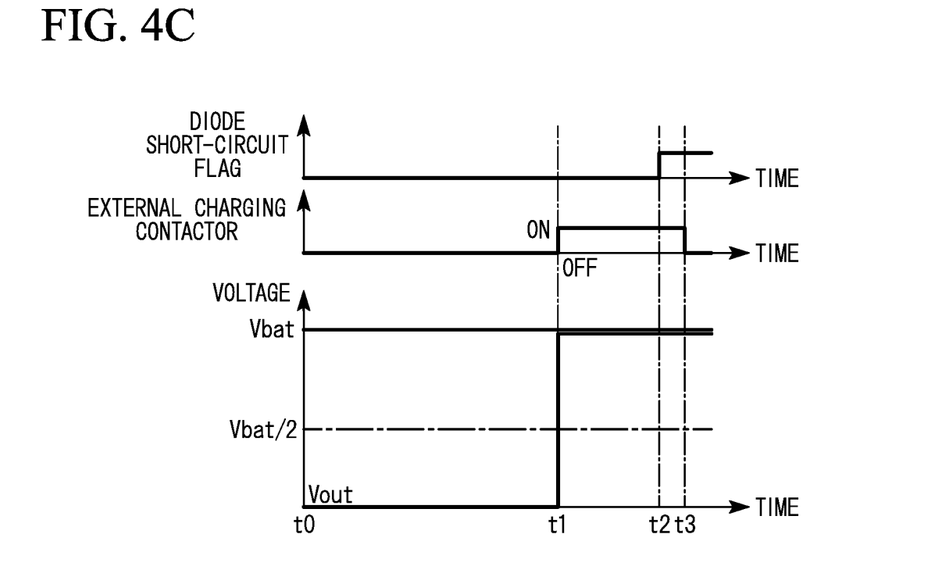
FIG. 4C illustrates graphs showing, in the electric vehicle charging apparatus according to the embodiment of the present invention, an example of a relationship among the vehicle-side voltage (the battery voltage Vbat), the charger-side voltage (the output voltage) Vout, an on/off state of the external charging contactor, and the diode short-circuit flag.

For example, in the state of step S11, for example, as illustrated in FIG. 4C, the charger-side voltage Vout is greater than ½ of the battery voltage Vbat before time reaches from the time t0 to the time t1.

Even though each of the positive pole-side contactor 22p and the negative pole-side contactor 22n is switched from an open state to a connection (a connection by closing) state at the time t1, the charger-side voltage Vout is maintained greater than ½ of the battery voltage Vbat while remaining unchanged.

In step S11, if the present value and the previous value (the stored value) of the charger-side voltage Vout do not change on the premise that the charger-side voltage Vout and the battery voltage Vbat are different from each other in an initial state, it is determined that an abnormal state (a breakdown state) of the diode (D) 23 does not occur.

Figure 4D:
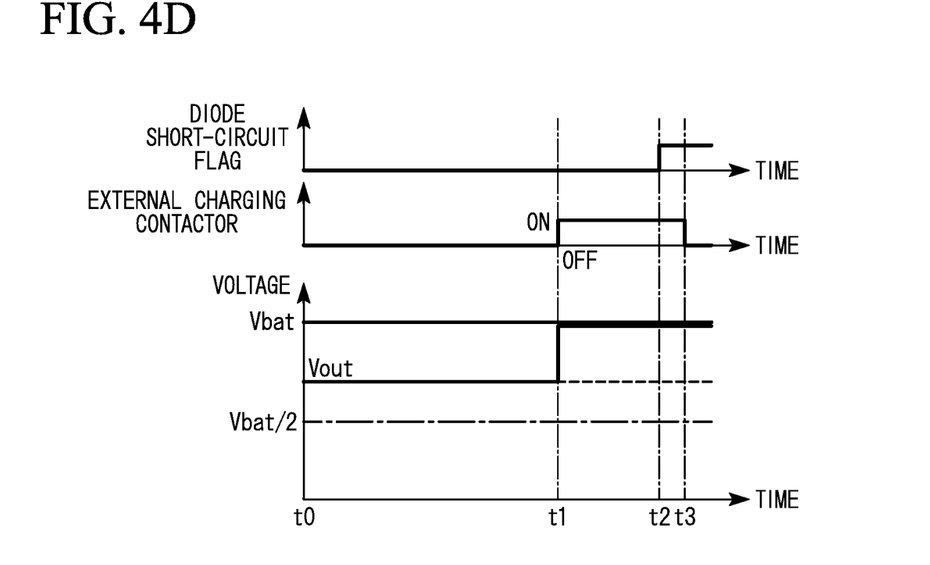
FIG. 4D illustrates graphs showing, in the electric vehicle charging apparatus according to the embodiment of the present invention, an example of a relationship among the vehicle-side voltage (the battery voltage Vbat), the charger-side voltage (the output voltage) Vout, an on/off state of the external charging contactor, and the diode short-circuit flag.

For example, in the state of step S12, for example, as illustrated in FIG. 4D, the charger-side voltage Vout is greater than ½ of the battery voltage Vbat before time reaches from the time t0 to the time t1.

As each of the positive pole-side contactor 22p and the negative pole-side contactor 22n is switched from an open state to a connection (a connection by closing) state at the time t1, the charger-side voltage Vout greatly changes.

In this case, at the time t2, a flag value of a diode short-circuit flag is switched from "0" to "1", and it is confirmed that the diode (D) 23 is in an abnormal state (that is, in a breakdown state).

Furthermore, at time t3, the positive pole-side contactor 22p and the negative pole-side contactor 22n are switched from the connection (the connection by closing) state to the open state.

Figure 5A:
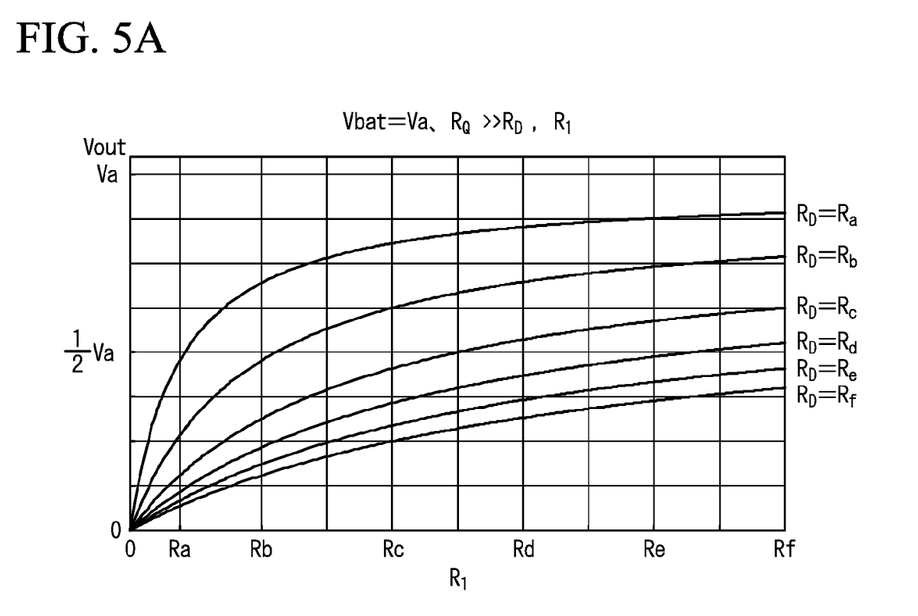
FIG. 5A illustrates a graph showing an example of a relationship among the charger-side voltage (the output voltage), an equivalent resistance value $R_D$ of a diode and a resistance value $R_1$ of a resistor in the electric vehicle charging apparatus according to the embodiment of the present invention.
Figure 5B:
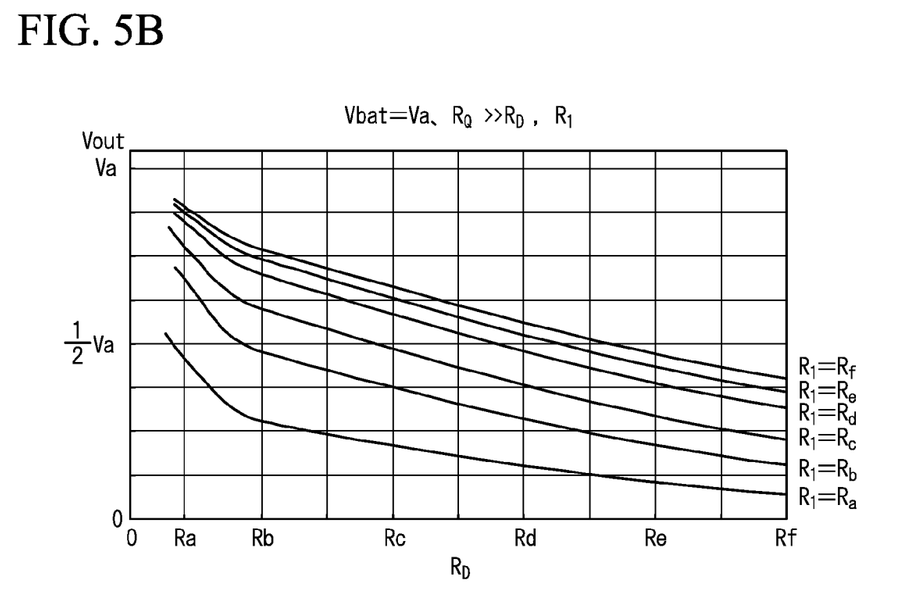
FIG. 5B illustrates a graph showing an example of a relationship among the charger-side voltage (the output voltage), the equivalent resistance value $R_D$ of a diode and the resistance value $R_1$ of a resistor in the electric vehicle charging apparatus according to the embodiment of the present invention.

For example, as illustrated in FIGS. 5A and 5B, when the battery voltage Vbat is a predetermined voltage Va, and based on the charger 1-side resistance value $R_Q$, the resistance value $R_1$ of the resistor 25 gets infinitely close to the resistance value R shown by the equation (1), that is, when the charger 1-side resistance value $R_Q$ is remarkably great compared to each of the resistance values $R_D$ and $R_1$, the charger-side voltage Vout changes in an increasing tendency as the resistance value $R_1$ of the resistor 25 increases, and the charger-side voltage Vout changes in a decreasing tendency as the equivalent resistance value $R_D$ of the diode (D) 23 increases.

When the diode (D) 23 is normal, and the resistance value $R_1$ of the resistor 25 is the same as the equivalent resistance value $R_D$ of the diode (D) 23, the charger-side voltage Vout becomes equal to or less than ½ of the battery voltage Vbat.

In this case, for example, a detected value of the battery voltage Vbat is described using a true value of the battery voltage Vbat and a detection error α (%) of the vehicle-side voltage sensor 26 as shown in the following equation (3).

A detected value of the charger-side voltage Vout is described using a true value of the charger-side voltage Vout and a detection error β (%) of the charger-side voltage sensor 15, for example, as shown in the following equation (4).

When based on the charger 1-side resistance value $R_Q$, the resistance value $R_1$ of the resistor 25 gets infinitely close to the resistance value R shown by the equation (1), for example, the true values of the charger-side voltage Vout and the battery voltage Vbat are described as shown in the following equation (5).

[Equation 3]

$$Vbat(\text{detected value}) = Vbat(\text{true value}) \times \left(1 - \frac{\alpha}{100}\right) \quad (3)$$

[Equation 4]

$$Vout(\text{detected value}) = Vout(\text{true value}) \times \left(1 + \frac{\beta}{100}\right) \quad (4)$$

For example, a condition under which it can be determined that the diode (D) 23 is in an abnormal state (that is, in a breakdown state) is described as shown in the following equation (6), and for example, the condition is described with respect to the resistance value $R_1$ of the resistor 25 as shown in the following equation (7).

[Equation 6]

$$Vbat(\text{detected value}) > Vout(\text{detected value}) \quad (6)$$

[Equation 7]

$$R_1 > R_D \cdot \frac{100 - \alpha}{\alpha + \beta} \quad (7)$$

As described above, in the electric vehicle charging apparatus 10 according to the embodiment, when it is determined whether or not the diode (D) 23 is in an abnormal state such as a breakdown state based on comparison between the battery voltage Vbat detected on the vehicle side and the charger-side voltage Vout detected on the outside vehicle charger 1 side and the like, even though the charger 1-side resistance value $R_Q$ is unknown, it is possible to appropriately determine whether or not an abnormal state exists.

That is, even though the charger 1-side resistance value $R_Q$ is unknown, when the diode (D) 23 is normal, it is possible to regard the charger-side voltage Vout as being equal to or less than at least ½ of the battery voltage Vbat.

Accordingly, when the charger-side voltage Vout is greater than ½ of the battery voltage Vbat, it is possible to appropriately determine that the diode (D) 23 is in a breakdown state.

When the charger-side voltage Vout greatly changes as a state of each of the positive pole-side contactor 22p and the negative pole-side contactor 22n changes from an open state to a connection (a connection by closing) state, it is possible to appropriately determine that the diode (D) 23 is in a breakdown state.

Figure 6:
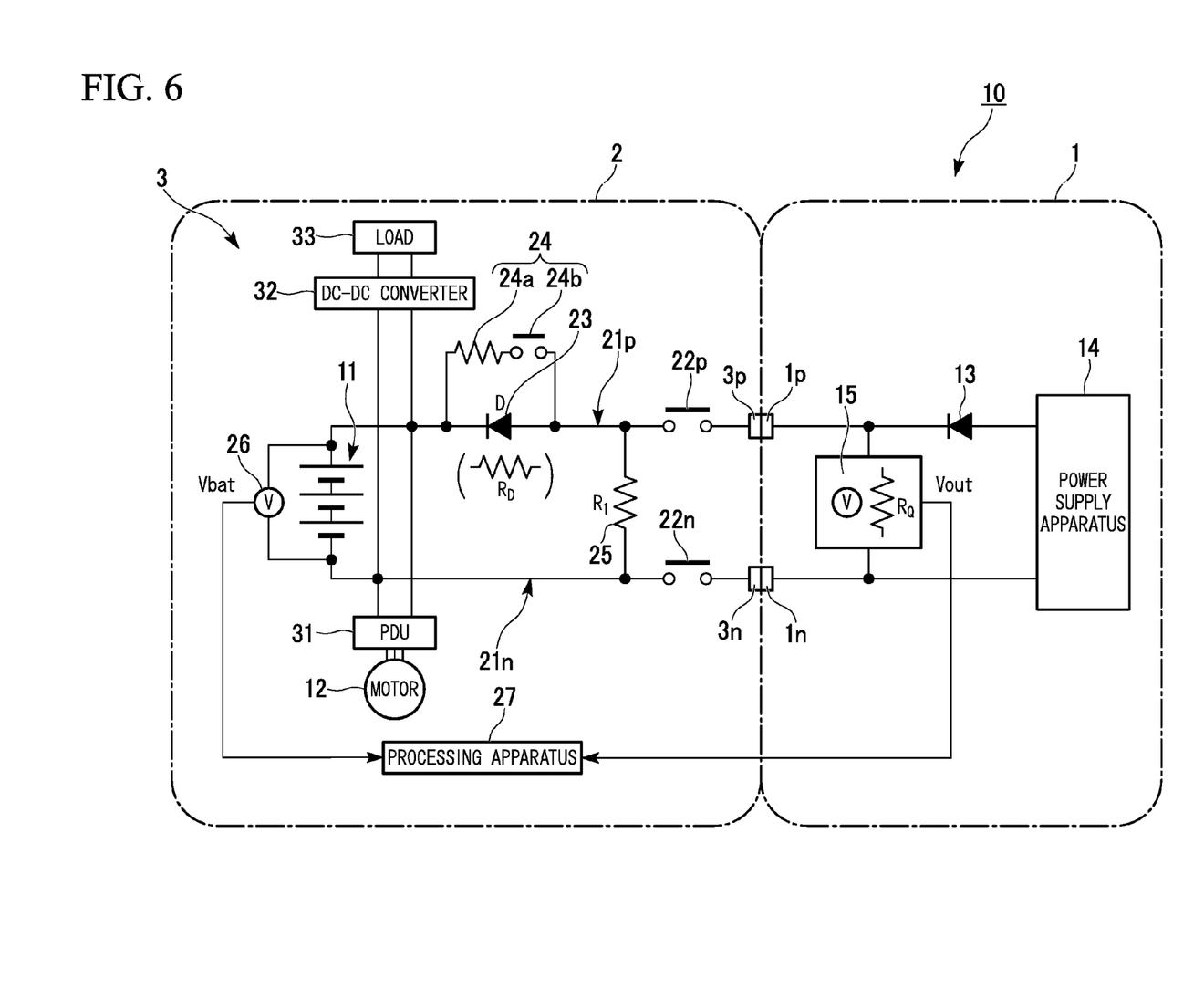
FIG. 6 is a configuration diagram of an electric vehicle charging apparatus according to another embodiment of the present invention.

Hereinafter, an electric vehicle charging apparatus according to another embodiment of the present invention will be described with reference to FIG. 6. In the following description, the same reference signs will be assigned to the same or equivalent configuration portions of the embodiment described above, and the same or equivalent configuration portions will be briefly described or descriptions thereof will be omitted.

In the electric vehicle charging apparatus 10 according to the embodiment, the resistor 25 is provided on a battery 11 side farther from the positive pole-side contactor 22p and the negative pole-side contactor 22n, and the resistor 25 connects a section between the positive pole-side contactor 22p and the diode (D) 23 in the vehicle-side charging positive pole line 21p and a section between the negative pole-side contactor 22n and the battery 11 in the vehicle-side charging negative pole line 21n.

In other words, the positive pole-side contactor 22p is provided between the resistor 25 and the vehicle-side charging connector 3p, and the negative pole-side contactor 22n is provided between the resistor 25 and the vehicle-side charging connector 3n. That is, in the embodiment, the resistor 25 is provided at a position different from that in the embodiment described above.

According to the embodiment, even though a charger 1-side resistance value including an internal impedance of the charger-side voltage sensor 15 is unknown, it is not necessary, for example, to provide a voltage sensor having a known internal impedance between both poles of the charger 1 or the like, and it is possible to appropriately determine whether or not an abnormal state exists.

Since the embodiment has a simple configuration in which only the resistor 25 is installed between the vehicle-side charging positive pole line 21p and the vehicle-side charging negative pole line 21n, it is possible to appropriately determine whether or not the diode (D) 23 is in an abnormal state while suppressing an increase in cost necessary for the configuration.

Furthermore, when it is determined that the diode (D) 23 is in an abnormal state such as a breakdown state, each of the contactors 22p and 22n is quickly opened. Accordingly, even though a short circuit occurs between each of the contactors 22p and 22n and the charger 1, it is possible to prevent electromagnetic repulsion from occurring at each of the contactors 22p and 22n and to safely detach the charger 1-side connectors 1p and 1n and the electric vehicle 2-side connectors 3p and 3n from each other.

Furthermore, even in a case where a high voltage is applied from the charger 1 side to the electric vehicle 2 side in a state where each of the contactors 22p and 22n is in an open state, then a voltage change (for example, a discharging velocity) between the charger-side connectors 1p and 1n is detected, and then it is determined whether a circuit is insulated based on the detected result, it is possible to prevent the discharging velocity from increasing to exceed a predetermined normal range using the resistor 25, and it is possible to prevent occurrence of insulation failure from being falsely detected.

That is, since the resistor 25 is disposed on the battery 11 side farther from each of the contactors 22p and 22n, even though a high voltage is applied from the charger 1 side to the electric vehicle 2 side in a state where each of the contactors 22p and 22n is in an open state, the resistor 25 is prevented from functioning as so-called discharging resistance.

Accordingly, it is possible to appropriately (that is, without discharge being caused by the resistor 25) detect a voltage change (for example, a discharging velocity) between the charger-side connectors 1p and 1n after a high voltage is applied, and based on the detected result, it is possible to accurately detect whether or not insulation failure exists.

A technical range of the present invention is not limited to the embodiments, and various modifications can be made to the embodiments insofar as the modifications do not depart from the scope of the present invention. That is, the configurations of the embodiments are just examples, and can be appropriately modified.

DESCRIPTION OF THE REFERENCE SYMBOLS

1: charger
1p, 1n: charger-side connector
3p, 3n: vehicle-side charging connector
10: electric vehicle charging apparatus
11: battery (power storage apparatus)
15: charger-side voltage sensor (voltage acquisition unit)
21p, 21n: vehicle-side charging line
22p: positive pole-side contactor (relay, charging contactor)
22n: negative pole-side contactor (relay, charging contactor)
23: diode
25: resistor
26: vehicle-side voltage sensor (stored power voltage detection unit)
27: processing apparatus (abnormality determination unit, second abnormality determination unit)
step S06: abnormality determination unit
step S12: second abnormality determination unit

The invention claimed is:

1. An electric vehicle charging apparatus equipped with a power storage apparatus that is capable of being charged with an outside vehicle charger, the apparatus comprising:
a vehicle-side charging connector that is attachably and detachably connected to a charger-side connector provided in the charger;
vehicle-side charging positive pole and negative pole lines that connect the vehicle-side charging connector and the power storage apparatus;
a diode that is provided in the vehicle-side charging line, in which a forward direction is connected toward the power storage apparatus from the charger;
a resistor that is disposed in the vehicle to connect the vehicle-side charging positive pole line and the vehicle-side charging negative pole line, at a location on the lines extending between the diode and the vehicle-side charging connector;
a stored power voltage detection unit that detects the voltage of the power storage apparatus;

a voltage acquisition unit that acquires the voltage between the charger-side positive pole connector and the charger-side negative pole connector; and an abnormality determination unit which determines that the diode is in a breakdown state based on the voltage of the power storage apparatus when charging of the power storage apparatus and the voltage between the charger-side positive pole connector and the charger-side negative pole connector, wherein a resistance value of the resistor is equal to a resistance value of the diode in the breakdown state.

2. The electric vehicle charging apparatus according to claim 1, further comprising:

a contactor that is provided between the vehicle-side charging connector and the resistor, and that is connected while charging is performed.

3. The electric vehicle charging apparatus according to claim 1, further comprising:

a contactor that is capable of shutting off conduction between the power storage apparatus and the resistor.

4. The electric vehicle charging apparatus according to claim 1, wherein the resistor has the same resistance value as a resistance value that corresponds to a reverse current occurring due to a reverse bias of the diode in a non-breakdown state.

5. The electric vehicle charging apparatus according to claim 4, wherein the abnormality determination unit determines that the diode is in a breakdown state when charging of the power storage apparatus is not being performed by the charger, the contactor is connected, and the voltage between the charger-side positive pole and negative pole connectors acquired by the voltage acquisition unit is greater than ½ of the voltage of the power storage apparatus detected by the stored power voltage detection unit.

6. The electric vehicle charging apparatus according to claim 5, wherein in a state where charging of the power storage apparatus is not being performed by the charger, the contactor is open, and the voltage between the charger-side positive pole and negative pole connectors acquired by the voltage acquisition unit is less than ½ of the voltage of the power storage apparatus detected by the stored power voltage detection unit, when the contactor is set to be in a connection state, and then the voltage between the charger-side positive pole and negative pole connectors acquired by the voltage acquisition unit is greater than ½ of the voltage of the power storage apparatus detected by the stored power voltage detection unit, the abnormality determination unit determines that the diode is in a breakdown state, and wherein the electric vehicle charging apparatus further comprises a second abnormality determination unit that stores the voltage between the charger-side positive pole and negative pole connectors as a stored voltage when charging of the power storage apparatus is not being performed by the charger, the contactor is open, and the voltage between the charger-side positive pole and negative pole connectors acquired by the voltage acquisition unit is equal to or greater than ½ of the voltage of the power storage apparatus detected by the stored power voltage detection unit, and that determines that the diode is in a breakdown state when the contactor is set to be in a connection state, and then the voltage between the charger-side positive pole and negative pole connectors acquired by the voltage acquisition unit is greater than the stored voltage.

7. The electric vehicle charging apparatus according to claim 2, wherein the resistor has the same resistance value as a resistance value that corresponds to a reverse current occurring due to a reverse bias of the diode in a non-breakdown state.

8. The electric vehicle charging apparatus according to claim 3, wherein the resistor has the same resistance value as a resistance value that corresponds to a reverse current occurring due to a reverse bias of the diode in a non-breakdown state.

9. The electric vehicle charging apparatus according to claim 7, wherein the abnormality determination unit determines that the diode is in a breakdown state when charging of the power storage apparatus is not being performed by the charger, the contactor is connected, and the voltage between the charger-side positive pole and negative pole connectors acquired by the voltage acquisition unit is greater than ½ of the voltage of the power storage apparatus detected by the stored power voltage detection unit.

10. The electric vehicle charging apparatus according to claim 8, wherein the abnormality determination unit determines that the diode is in a breakdown state when charging of the power storage apparatus is not being performed by the charger, the contactor is connected, and the voltage between the charger-side positive pole and negative pole connectors acquired by the voltage acquisition unit is greater than ½ of the voltage of the power storage apparatus detected by the stored power voltage detection unit.

11. The electric vehicle charging apparatus according to claim 9, wherein in a state where charging of the power storage apparatus is not being performed by the charger, the contactor is open, and the voltage between the charger-side positive pole and negative pole connectors acquired by the voltage acquisition unit is less than ½ of the voltage of the power storage apparatus detected by the stored power voltage detection unit, when the contactor is set to be in a connection state, and then the voltage between the charger-side positive pole and negative pole connectors acquired by the voltage acquisition unit is greater than ½ of the voltage of the power storage apparatus detected by the stored power voltage detection unit, the abnormality determination unit determines that the diode is in a breakdown state, and wherein the electric vehicle charging apparatus further comprises a second abnormality determination unit that stores the voltage between the charger-side positive pole and negative pole connectors as a stored voltage when charging of the power storage apparatus is not being performed by the charger, the contactor is open, and the voltage between the charger-side positive pole and negative pole connectors acquired by the voltage acquisition unit is equal to or greater than ½ of the voltage of the power storage apparatus detected by the stored power voltage detection unit, and that determines that the diode is in a breakdown state when the contactor is set to be in a connection state, and then the voltage between the charger-side positive pole and negative pole connectors acquired by the voltage acquisition unit is greater than the stored voltage.

12. The electric vehicle charging apparatus according to claim 10, wherein in a state where charging of the power storage apparatus is not being performed by the charger, the contactor is open, and the voltage between the charger-side positive pole and negative pole connectors acquired by the voltage acquisition unit is less than ½ of the voltage of the power storage apparatus detected by the stored power voltage detection unit, when the contactor is set to be in a connection state, and then the voltage between the charger-side positive pole and negative pole connectors acquired by the voltage acquisition unit is greater than ½ of the voltage of the power storage apparatus detected by the stored power voltage detection unit, the abnormality determination unit determines that the diode is in a breakdown state, and wherein the electric vehicle charging apparatus further comprises a second abnormality determination unit that stores the voltage between the charger-side positive pole and negative pole connectors as a stored voltage when charging of the power storage apparatus is not being performed by the charger, the contactor is open, and the voltage between the charger-side positive pole and negative pole connectors acquired by the voltage acquisition unit is equal to or greater than ½ of the voltage of the power storage apparatus detected by the stored power voltage detection unit, and that determines that the diode is in a breakdown state when the contactor is set to be in a connection state, and then the voltage between the charger-side positive pole and negative pole connectors acquired by the voltage acquisition unit is greater than the stored voltage.

* * * * *